UNITED STATES PATENT OFFICE.

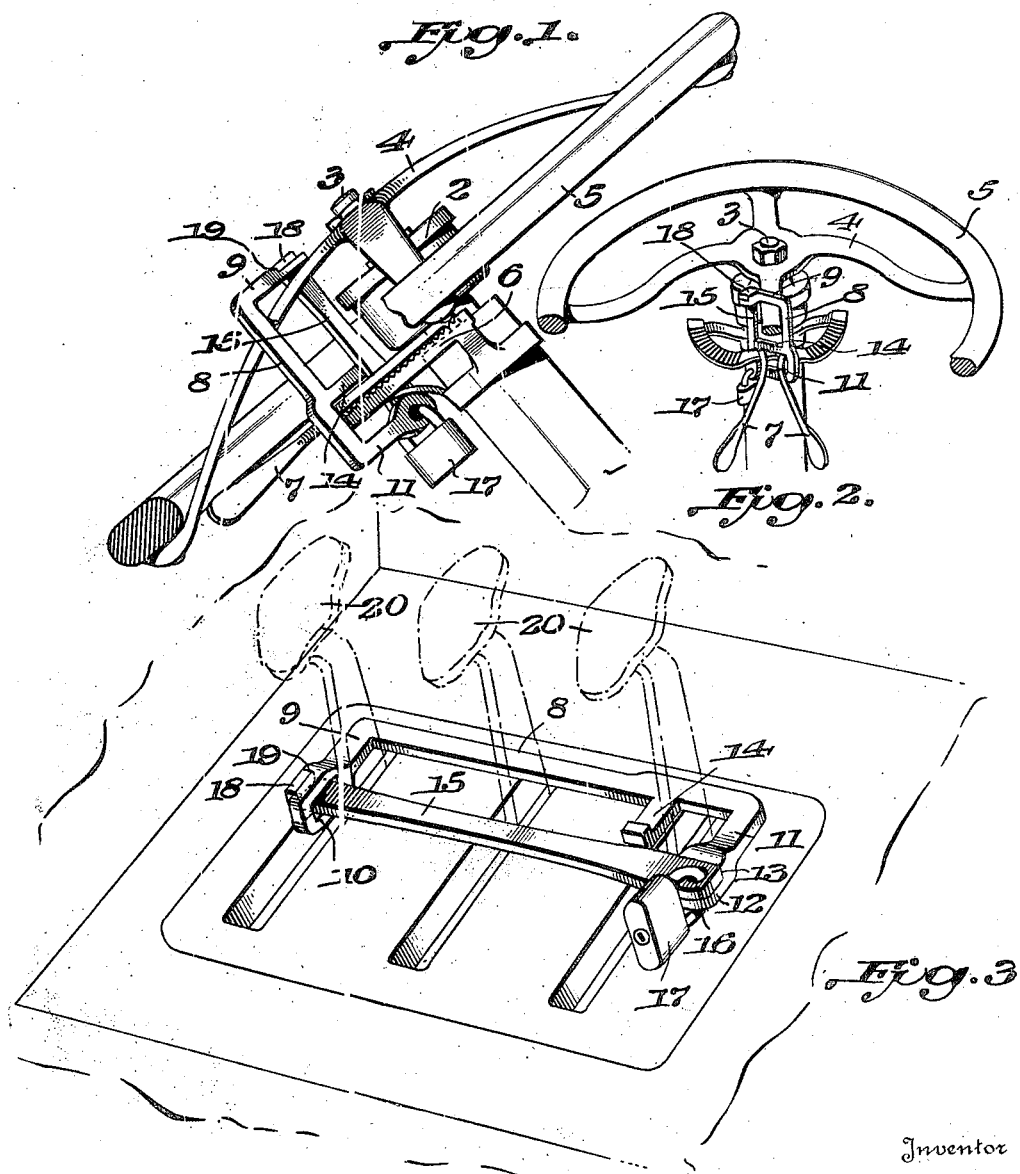

CLARENCE L. McDUFF, OF DETROIT, MICHIGAN.

PEDAL AND CONTROL-LEVER LOCK.

1,380,817.                  Specification of Letters Patent.    Patented June 7, 1921.

Application filed November 5, 1920. Serial No. 421,829.

*To all whom it may concern:*

Be it known that I, CLARENCE L. McDUFF, a citizen of the United States of America, residing at Detroit, in the county of Wayne and State of Michigan, have invented certain new and useful Improvements in Pedal and Control-Lever Locks, of which the following is a specification, reference being had therein to the accompanying drawings.

This invention relates to devices for preventing the unauthorized use of motor vehicles, and more particularly to a device which may be applied to the steering wheel or foot pedals of a Ford car.

The object of the invention is to provide a very simple device which is cheap to manufacture and readily applicable for use and the construction of which is such that it may be applied to the steering wheel of a Ford car to embrace the control levers and their sector and also an arm of the steering wheel spider to hold said levers and wheel against operation.

A further object is to construct a device so that it may be applied to the steering wheel to hold the same and its control levers and is also adapted to be applied to the several foot pedals to embrace the same and prevent their independent operation.

A further object is to provide a device having certain new and useful features, all as hereinafter more fully described.

With the above and other ends in view, the invention consists in the matters hereinafter set forth, and more particularly pointed out in the appended claims, reference being had to the accompanying drawing, in which—

Figure 1 is a side elevation of a steering wheel with a portion thereof broken away and in section and showing control levers adjacent the wheel with a device illustrative of the invention in operative position thereon to hold the wheel and control levers against operation;

Fig. 2 is a perspective view of Fig. 1, and

Fig. 3 is a perspective view of the device embodying the invention and showing the same as applied to the foot pedals of a motor vehicle for preventing their operation.

This invention relates to a device which is so constructed as to be particularly applicable to a motor vehicle having a steering wheel with a control lever or levers located adjacent the wheel and directly below the same, together with a notched sector for such levers; and it is particularly applicable to a motor vehicle having a plurality of foot pedals located side by side for controlling the operation of the machine.

The motor vehicle parts illustrated in the accompanying drawing are arranged in a manner substantially the same as in vehicles known as "Ford" automobiles, but it will be understood that this device may be applied to other makes of motor cars wherever the same is applicable for such use.

In Figs. 1 and 2 of the drawings, 1 indicates a steering column upon which is mounted a gear casing 2 with a shaft 3 extending axially from the casing, to which shaft the hub of the spider 4 of a steering wheel 5 is secured. Supported upon the steering column 1 directly below the wheel 5 is a notched sector 6 and this sector is engaged by a pair of control levers 7 which are pivotally supported at one end upon the steering column at each side thereof to swing over the sector in contact therewith, said levers being the spark and throttle levers which control the operation of the engine mounted upon the vehicle, such arrangement of the steering wheel levers and parts being all old and well known.

The device embodying the invention comprises a suitable bar 8 provided at one end with a laterally extending arm 9 having an eye or opening 10 therein, and at its opposite end with an arm 11 formed with an enlarged head 12 provided with a shoulder 13 and an opening through the head. Intermediate its ends, the bar 8 is formed with a laterally extending arm 14 and a loose latch bar or pin 15 is provided and is adapted to be inserted endwise through the eye 10 and to engage the head 12 at one end, said end of the latch bar being formed with an opening 16 to register with the opening in the head 12 so that the staple or locking bolt of a suitable pad lock 17 may be inserted through said openings to secure the end of the latch bar to the end of the arm 11. The opposite end of the bar 15 is formed with a rectangular head 18 to fit closely against the side of the eye 10 and the end of the arm 9 is formed with a shoulder 19 to engage one side of the head 18 and prevent any turning movement of the bar 15 within the eye 10. The end of the bar 15 which engages the head 12 of the arm 11, is provided with a straight side to engage the shoulder 13 on said head which provides a firm seat for said end of the latch bar. The latch bar is therefore a split member which may be entirely disengaged from the U-shaped frame member comprising the bar 8 and end arms 9 and 11 thereon. The U-shaped frame member may therefore be applied to the wheel 5 and sector 6 with one of its arms extending above and across an arm of the spider 4 and the other arm extending below and across the sector 6, with the intermediate arm 14 of the frame member extending across and over one or both of the control levers 7. The latch bar 15 may then be slipped endwise through the eye 10 and downwardly past the arm of the spider, to the control levers and through the sector bringing its lower end into engagement with the head 12 with the opening therein in line with the opening in said head, and then by applying the pad lock, the device is securely locked in place with the frame embracing the arm of the spider, the sector and control levers, thus preventing their operation. The arm 14 of the frame, when said device is in operative position, extends across the upper side of the control levers to more firmly hold them and to form a rectangular opening in one end of the frame for said levers and sector, preventing undue movement of the locking device when in place also said arm forms an abutment for one side of the latch bar 15.

In Fig. 3 the device is shown as applied to the control pedals of a motor vehicle, said pedals being indicated in dotted lines at 20. In this instance the three pedals are first brought into alinement and then the U-frame is engaged therewith with the arms 9 and 11 extending adjacent the outer sides of the end pedals of the row and the arm 14 extending adjacent the inner side of one of the pedals. The latch bar 15 is then slipped endwise through the eye 10 and its opposite end made fast to the head 12 of the opposite end arm by means of the pad lock 17, the bar 8 thus extending along one side of the row of pedals and the latch bar 15 extending along the opposite side of said row. The three pedals are therefore engaged within a rigid closed frame and are thereby held against independent movement.

Obviously, changes may be made in the form of the device and proportionate size of the parts within the scope of the appended claims without departing from the spirit of the invention and I do not therefore limit myself to the particular construction shown.

Having thus fully described my invention, what I claim is:—

1. A device of the character described comprising a rigid frame member having a laterally extending arm at each end and an intermediate laterally extending arm, one of said end arms being formed with an eye and the other of said end arms being formed with an opening, a bar to close the open side of said frame and adapted to be inserted endwise through said eye, said bar being formed with a rectangular head to seat against the arm having the eye and said bar being provided at its opposite end with an opening to register with the opening in the adjacent frame arm, said intermediate frame arm being of a length to engage the side of said insertible bar intermediate its ends.

2. A device of the character described comprising a rigid frame member consisting of a bar formed with a laterally extending arm at each end and a laterally extending arm intermediate its ends, one of said end arms being formed with an eye and a shoulder adjacent the eye and the other end arm being formed with a seat having an opening, and a shoulder adjacent the seat, and a latch bar insertible endwise through the eye and adapted to close the open side of the rigid frame, said bar having a rectangular head to engage the outer side of the eye and said shoulder, and the opposite end of said bar being adapted to seat upon the seat of the other arm and having an opening to register with the opening in said seat.

In testimony whereof I affix my signature in presence of two witnesses.

CLARENCE L. McDUFF.

Witnesses:
ANNA M. DORR,
KARL H. BUTLER.